S. D. HUFFMAN.

Thrashing Machine.

No. 88,716.  Patented April 6, 1869.

Witnesses  Inventor

S. D. HUFFMAN, OF NEW GERMANTOWN, NEW JERSEY.

Letters Patent No. 88,716, dated April 6, 1869.

IMPROVEMENT IN THRESHING-MACHINE.

The Schedule referred to in these Letters Patent and making part of the same.

*To all whom it may concern:*

Be it known that I, S. D. HUFFMAN, of New Germantown, in the county of Hunterdon, and in the State of New Jersey, have invented certain new and useful Improvements in Threshing-Machines; and do hereby declare that the following is a full, clear, and exact description thereof, reference being had to the accompanying drawings, and to the letters of reference marked thereon.

The nature of my invention consists in the construction and arrangement of a device to be attached to a threshing-machine, for the purpose of protecting the feeder from the dust.

In order to enable others skilled in the art to which my invention appertains to make and use the same, I will now proceed to describe its construction and operation, referring to the annexed drawings, which form a part of this specification, and in which—

Figure 1:
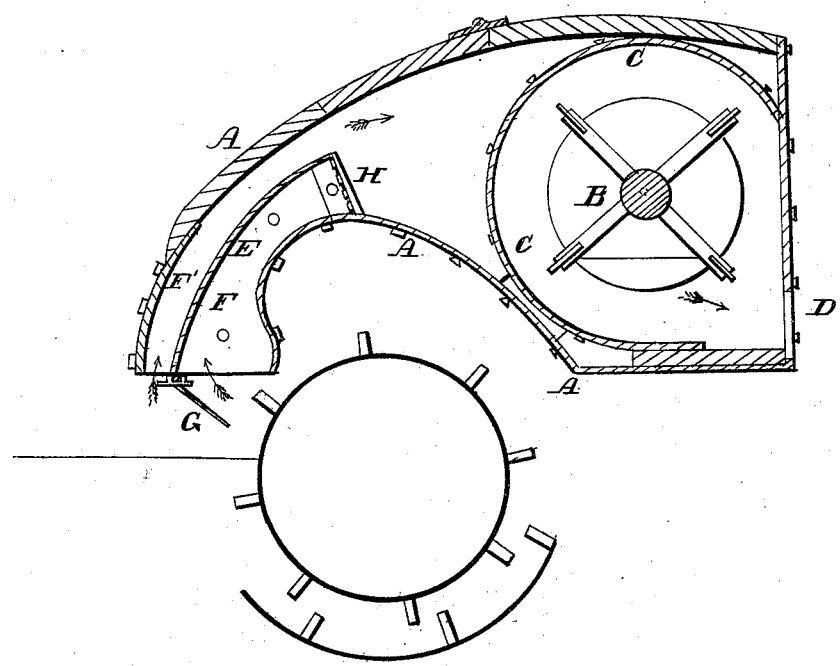
Figure 1 is a longitudinal vertical section of my device.
Figure 2:
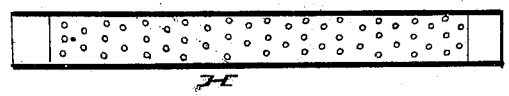
Figure 2 is a side view of a perforated plate used in the same, to prevent too much suction.

A represents the shell of the machine, which I call a "duster," and in which, at the larger end, are placed one or more fans, B.

Each of these fans has a drum, C, around the same, said drum being open at both sides, and having an aperture, D, at the rear end.

In front of the drum or drums C, the upper side of the shell A is curved downward, while the under side of said shell is curved upward, and then downward again, forming the mouth of the duster.

This mouth is, by a wall, or partition, E, for a certain distance divided into two channels, F and F'.

Below the mouth of the duster, at the lower edge of the partition E, is suspended a hinged plate, G, extending the whole distance of the mouth.

The inner channel, F, is, at the inner end of the partition E, provided with a perforated plate or covering, H.

The duster, thus constructed, is placed with its mouth above the place where the grain is fed into the threshing-machine. As the grain is fed into the threshing-machine, a great deal of dust and dirt arises from the same, which is not only very annoying, but also deleterious to the person feeding.

If, now, the fan or fans B are put in motion, by a belt, or otherwise, connected with the threshing-machine, a current of air is produced which draws all this dust, &c., up through the channel F, and passes up through the drum or drums C, and out of the aperture D.

The perforated plate H, at the top of the channel F, prevents too great suction, by which straw or grain might be drawn up. Any dust which might escape, and not pass up through the channel F, will be drawn up through the outer channel, F', and thus completely protecting the feeder from the annoyance, &c., of the dust.

Having thus fully described my invention,

What I claim as new, and desire to secure by Letters Patent, is—

1. Providing the mouth, or chimney of a "duster" with a partition, so as to form an inner and an outer channel, substantially as and for the purposes herein set forth.

2. The arrangement of the shell A, partition E, channels F and F', perforated plate H, and hinged door G, all substantially as shown and described.

In testimony that I claim the foregoing, I have hereunto set my hand, this 5th day of December, 1868.

S. D. HUFFMAN.

Witnesses:
JAMES R. SWICK,
ALEXANDER V. JOHNSON.